(12) United States Patent
Keith et al.

(10) Patent No.: US 7,621,856 B1
(45) Date of Patent: Nov. 24, 2009

(54) REEL MECHANISM

(76) Inventors: Gary S. Keith, 6211 Sydney Rd., Fairfax Station, VA (US) 22039; Lia M. Keith, 6211 Sydney Rd., Fairfax Station, VA (US) 22039

( * ) Notice: Subject to any disclaimer, the term of this patent is extended or adjusted under 35 U.S.C. 154(b) by 0 days.

(21) Appl. No.: 12/232,727

(22) Filed: Sep. 23, 2008

(51) Int. Cl.
 A63B 21/045 (2006.01)
 A63B 21/018 (2006.01)
 B65H 75/34 (2006.01)

(52) U.S. Cl. .................. 482/127; 482/120; 119/796
(58) Field of Classification Search ......... 482/114–118, 482/120, 74, 72–73, 127, 131, 133; 473/445; 273/317; 119/794–796
See application file for complete search history.

(56) References Cited

U.S. PATENT DOCUMENTS

| | | | | |
|---|---|---|---|---|
| 885,074 | A * | 4/1908 | Nidever | 482/127 |
| 1,867,642 | A * | 7/1932 | Woods | 482/125 |
| 2,951,702 | A * | 9/1960 | Goodwin | 482/127 |
| 3,693,596 | A | 9/1972 | Croce | |
| 3,840,227 | A | 10/1974 | Chesemore | |
| 3,885,789 | A * | 5/1975 | Deluty et al. | 482/120 |
| 4,010,948 | A * | 3/1977 | Deluty | 482/120 |
| 4,114,875 | A * | 9/1978 | Deluty | 482/120 |
| 4,174,832 | A * | 11/1979 | Thompson | 482/120 |
| 4,328,965 | A * | 5/1982 | Hatfield | 482/122 |
| 5,147,264 | A | 9/1992 | Braathen | |
| 5,377,626 | A | 1/1995 | Kilsby et al. | |
| 5,423,494 | A | 6/1995 | Kondo | |
| 5,468,205 | A | 11/1995 | McFall et al. | |
| 5,556,369 | A | 9/1996 | Roberts | |
| 5,634,873 | A | 6/1997 | Carlstrom | |
| 5,762,029 | A | 6/1998 | DuBois et al. | |
| 5,820,529 | A | 10/1998 | Weintraub | |
| 6,015,371 | A | 1/2000 | Davitt | |
| 6,024,054 | A | 2/2000 | Matt et al. | |
| 6,148,773 | A * | 11/2000 | Bogdahn | 119/796 |
| 6,309,328 | B1 * | 10/2001 | Dudley | 482/120 |
| 6,319,179 | B1 | 11/2001 | Hinds | |
| 6,405,683 | B1 | 6/2002 | Walter et al. | |
| 6,413,196 | B1 * | 7/2002 | Crowson | 482/118 |
| 6,494,817 | B2 | 12/2002 | Lake | |
| 6,612,972 | B1 | 9/2003 | Reichard | |
| 6,659,922 | B1 * | 12/2003 | Yu | 482/127 |
| 6,688,260 | B2 | 2/2004 | Morrison | |
| 6,770,014 | B2 | 8/2004 | Amore | |
| 6,904,872 | B2 | 6/2005 | Müller | |
| 6,908,418 | B2 | 6/2005 | Sauré | |

(Continued)

Primary Examiner—Fenn C Mathew
(74) Attorney, Agent, or Firm—Richard C. Litman (57) ABSTRACT

The reel mechanism includes a case and a flexible line (webbing, etc.) retractably coiled therein. The line passes over a ramp and doubles back around a pin to exit the case. A pivoting chock has a toggle end raised by the line, depending on the line's departure path from the case, and an opposite grip end clamping the line against itself and the ramp when the toggle end is raised. Control of line payout, retraction, or locking is determined by the departure path of the line from the case. This mechanism provides sufficient clamping force on the line to support the weight of person therefrom while performing arm strengthening exercises. The case may include various handle configurations for different exercise routines, and the distal end of the line permits attachment to a variety of structures. The device may also be used as a pet leash or for other purposes.

20 Claims, 7 Drawing Sheets

U.S. PATENT DOCUMENTS

| | | |
|---|---|---|
| D519,246 S | 4/2006 | Plewa |
| 7,060,013 B2 * | 6/2006 | Steinbach et al. ............ 482/127 |
| 7,087,001 B1 * | 8/2006 | Ihli ............................ 482/115 |
| 2002/0022555 A1 | 2/2002 | Nesci |
| 2002/0119869 A1 | 8/2002 | Whited Lake |
| 2003/0183176 A1 | 10/2003 | Morrison |
| 2004/0033866 A1 | 2/2004 | Shapiro |
| 2004/0097349 A1 | 5/2004 | Rogers |
| 2004/0237907 A1 | 12/2004 | Muller |
| 2005/0221964 A1 | 10/2005 | Liester |
| 2005/0263103 A1 | 12/2005 | Updyke et al. |
| 2006/0084556 A1 | 4/2006 | Payne |
| 2006/0100071 A1 | 5/2006 | Elmhirst |
| 2006/0162675 A1 | 7/2006 | Ghalebi et al. |
| 2006/0201450 A1 | 9/2006 | Jordan et al. |
| 2007/0131177 A1 | 6/2007 | Perkitny |
| 2007/0155587 A1 | 7/2007 | Huang et al. |
| 2007/0204806 A1 | 9/2007 | Hurwitz |

* cited by examiner

REEL MECHANISM

BACKGROUND OF THE INVENTION

1. Field of the Invention

The present invention relates generally to handheld retractable leash and strap devices, and particularly to a reel mechanism having a retracting strap or flexible line and a locking mechanism actuated by the departure path of the strap or line extending therefrom.

2. Description of the Related Art

Innumerable retractable cords, lines, straps, webbing, and the like have been developed in the past for various purposes and uses. Examples include retractable reels for electrical cords, tape measures, and pet leashes, among others. These various devices further include a number of different locking mechanisms to secure the line or cord as desired, to prevent the line or cord from extending or retracting. Most such devices have a manually actuated lock of some sort, e.g., a friction device that bears against the extendable and retractable element. An example of such is found in many tape measures.

Such devices are limited in their utility, due to the locking mechanisms provided. These locking mechanisms generally do not hold securely when high tensile force is applied to the retractable element relative to the reel or case. This precludes the use of such reels and their locking mechanisms for use as an exercise device, as such reels cannot hold securely when the weight or force of an exercising person is applied thereto. Moreover, such devices require manual actuation of the lock or release mechanism, which may be difficult or impossible for the exercising person to perform when suspended from the device by his or her hands.

Thus, a reel mechanism solving the aforementioned problems is desired.

SUMMARY OF THE INVENTION

The reel mechanism has a housing or case and a coiled, flexible element (e.g., a strap, webbing, a cord, a line, or a tape) extensibly and retractably coiled therein. A light retraction spring is provided to urge the flexible element to a retracted state within the case. The webbing or line passes over a fixed ramp and around a guide pin in the case, and doubles back to exit the case through an opening above the reel. A chock is pivotally mounted in the case above the reel, adjacent to the opening. The chock includes a toggle end that is raised by the line, depending upon the departure path of the line from the case, and an opposite grip end that clamps the line against itself and the underlying ramp when the toggle end of the chock is raised. Thus, control of the payout, retraction, or locking of the line is accomplished by the departure path of the line relative to the case or housing of the device by the user tilting the device relative to the path of the line extending therefrom to lock or unlock the grip on the line.

The reel mechanism provides sufficient clamping force on the line extending therefrom to permit the device to suspend a considerable amount of weight therefrom. The reel mechanism may be useful as an exercise device, allowing a person to suspend oneself from the device (or devices) to perform various arm strengthening exercises. The case may include various handle configurations for different exercise routines, and the distal end of the strap, webbing, or line permits attachment to a variety of structures. The device may also be used as a pet leash or for other purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The reel mechanism is a handheld device for use as an exercise device, pet leash, or other uses. The mechanism includes a line-lock device enabling the user to lock or release the payout or retraction of the line from or to the reel according to the angle of the line extension relative to the case or housing of the device, i.e., the departure path of the line. The user may merely tilt his or her hand, arm, or wrist to control the angle of the case or housing relative to the path of the line extending therefrom to control the locking or release of the line from the housing.

Figure 1A:
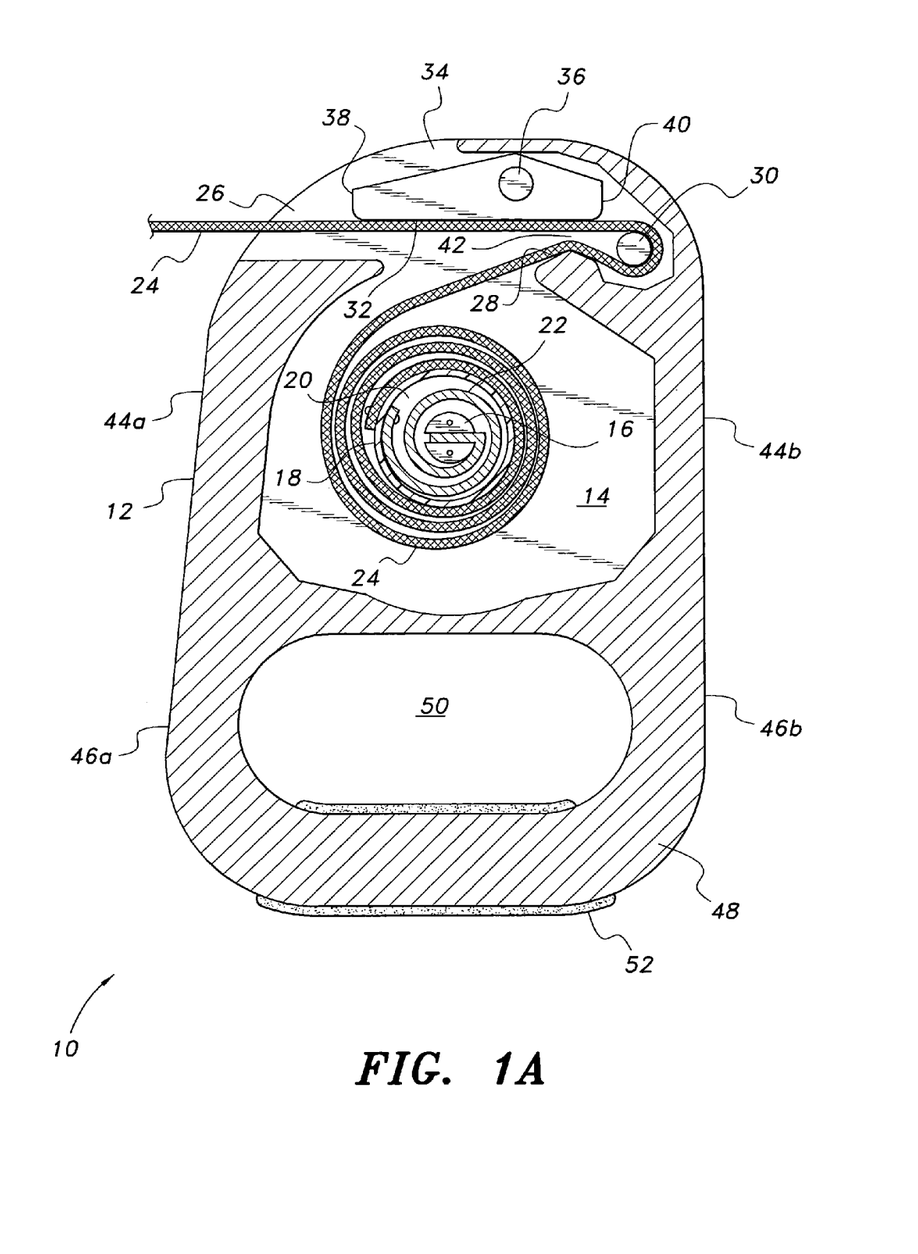
FIG. 1A is a front elevation view in section of a reel mechanism according to the present invention, shown in its unlocked condition.
Figure 1B:
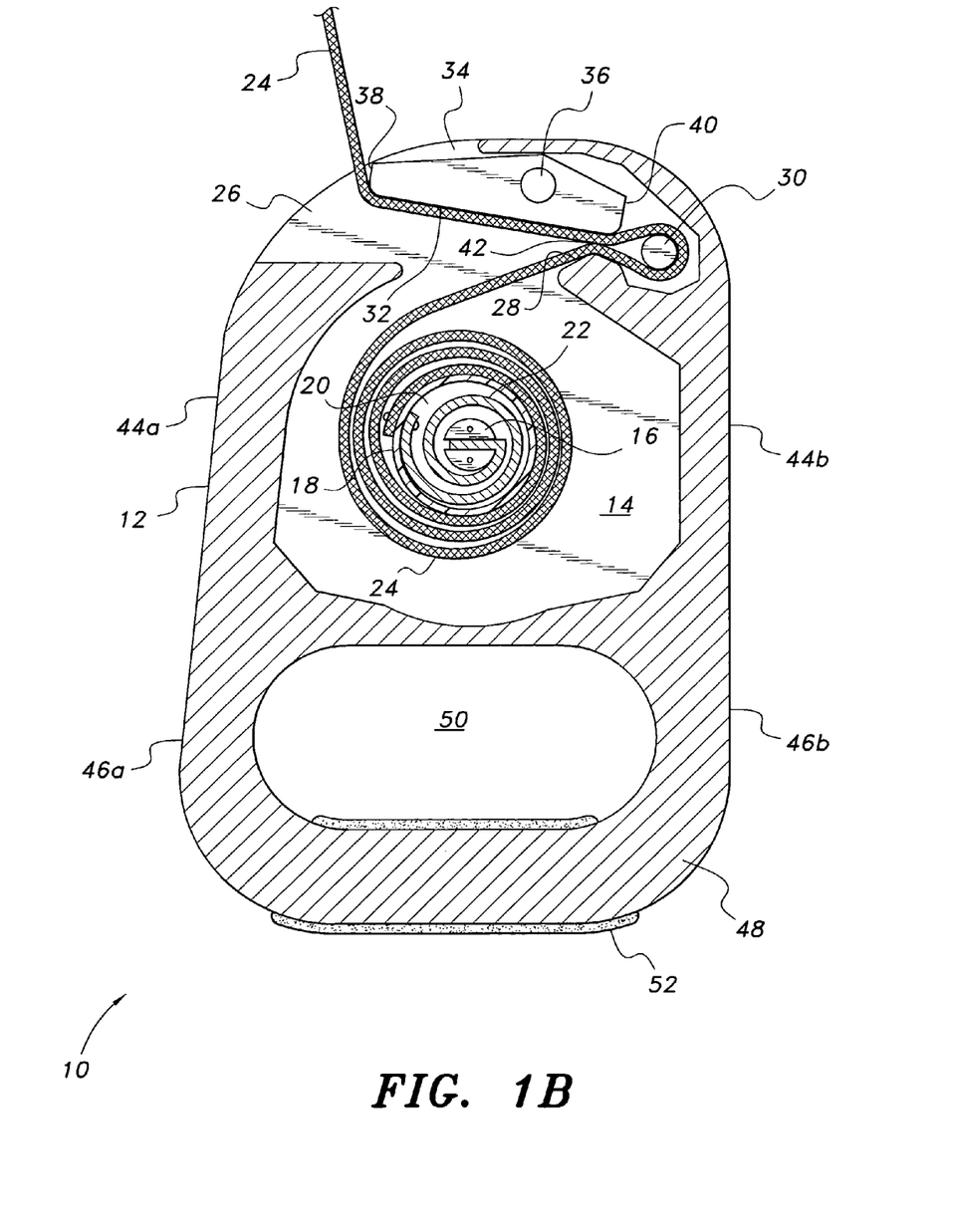
FIG. 1B is a front elevation view in section of the reel mechanism of FIG. 1A, showing the reel in a locked condition.

FIGS. 1A and 1B illustrate the basic configuration of the reel mechanism 10, with the line being unlocked in FIG. 1A and locked in FIG. 1B. The mechanism 10 includes a case or housing 12 having a reel cavity 14 therein, with a reel axle 16 disposed generally centrally within the reel cavity 14 and a reel or spool 18 rotatably installed upon the reel axle 16. The reel 18 has a hollow core therein defining a retraction spring cavity 20, with a line retraction spring 22 coiled within the spring cavity 20 between the axle 16 and the circumferential outer wall of the reel or spool 18. A flexible line 24 (e.g., a flat, woven fabric web material as shown in the drawings, or alternatively a cord, strap, tape, etc., as desired) is extensively coiled about the reel or spool 18, and extends from the case or housing 12 through a line opening 26 extending from and communicating with the reel cavity 14.

The line 24 passes through and over various components as it extends from the reel 18 and departs from the line opening 26. The line 24 first passes over a ramp 28 and then passes around a guide pin 30 distal to the ramp 28, i.e., the guide pin 30 is opposite the ramp 28 from the reel or spool 18. The line 24 then doubles back around the guide pin 30 to pass over the ramp 28 and portion of the line 24 resting thereon, and then extends along the line contact surface 32 of a chock 34 mounted on a chock pivot 36 within the case or housing 12, adjacent to the line opening 26.

The chock 34 is an elongate component extending in opposite directions from its pivot axis about the pivot 36. The chock 34 includes a toggle end 38 extending into the line opening 26 of the housing 12 and an opposite line grip end 40, with the line contact surface 32 extending between the two ends 38 and 40. The line grip end 40 is disposed directly opposite the ramp 28, with the line grip end 40 of the chock 34 and the ramp 28 defining a variable width line passage 42 therebetween depending upon the angle of the chock 34.

The angle of the chock 34 is controlled by the departure path of the line 24 from the case or housing 12, i.e., the path or angle defined by the taut line 24 relative to the case or housing, or more particularly the angle or path of the line 24 relative to the chock 34. In FIG. 1A, the line 24 is departing the case 12 on a path substantially tangentially with the line contact surface 32 of the chock 34 and the guide pin 30. Thus, the line 24 is not developing any upward force (in the orientation shown in FIG. 1A) to lift the toggle end 38 of the chock 34 away from the reel 18, and thus pivot the line grip end 40 of the chock downwardly against the double thickness of the line 24 as it passes between the ramp 28 and the grip end 40 of the chock 34. The line grip passage 42 is thus relatively wide in this situation, releasing the line 24 to pass freely therethrough without being gripped by the grip end 40 of the chock 34 bearing against the ramp 28 and the doubled thickness of the line 24 therebetween.

In FIG. 1B, the departure angle of the line 24 has changed from that shown in FIG. 1A. In FIG. 1B, the taut line 24 extending from the device is more closely aligned radially with the reel axle 16. This results in the line 24 lifting the toggle end 38 of the chock 34 away from the reel 18, thus pivoting the line grip end 40 of the chock 34 toward the ramp 28 and narrowing the line passage 42 between the ramp 28 and the line grip end 40 of the chock. When the line departure angle and tension on the line 24 are sufficient, the doubled thickness of the line 24 are clamped or gripped tightly between the ramp 28 and line grip end 40 of the chock 34, and cannot move relative to the mechanism 10. This locks the line 24 so that it cannot extend further from the housing 12. Yet, tilting the mechanism 10 to change the line departure path and allow the chock 34 to pivot back to a position somewhat as shown in FIG. 1A, releases the clamping pressure of the line grip end 40 of the chock 34 on the doubled thickness of the line 24 passing over the ramp 28, and allows the line 24 to pay out freely from the device 10 (or to be retracted back into the device 10 when tension is released on the line 24, due to the retraction spring 22).

Although the reel mechanism 10 is not limited to use as a handheld device, it is primarily intended as such. Accordingly, some form of handle is preferably provided with the case or housing 12. The reel mechanism 10 of FIGS. 1A and 1B includes a handle configuration formed essentially integrally with the case or housing 12, with the opposite sides 44a, 44b of the housing 12 having corresponding opposed and substantially coplanar first and second handle ends 46a, 46b extending therefrom generally opposite the line opening 26 of the housing 12. An elongate handle crossmember 48 extends between the distal ends of the handle ends 46a, 46b, with the housing or case 12, the two handle ends 46a and 46b, and the handle crossmember 48 defining an ovoid handgrip passage 50 therebetween. The handle crossmember 48 serves as the actual handgrip for the user of the device, and may include some form of resilient and/or high coefficient of friction handgrip padding 52 disposed thereon, as shown in cross section in FIGS. 1A and 1B.

Figure 3:
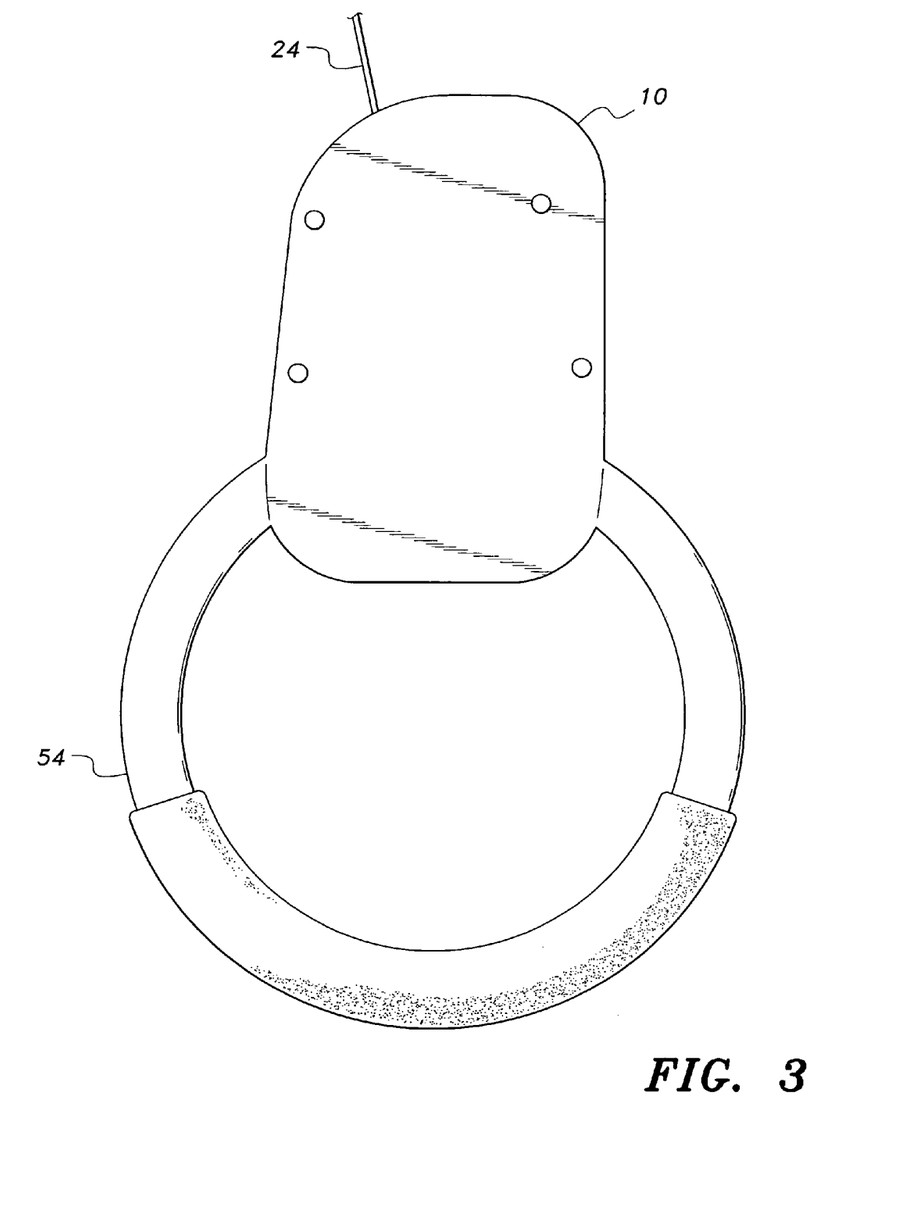
FIG. 3 is a front elevation view of an alternative embodiment of a reel mechanism according to the present invention having a circular ring handle.

An alternative handle configuration is shown in FIG. 3 of the drawings, with the case or housing 10 having a handle 54 in the form of a substantially circular ring extending therefrom, generally opposite the line opening of the case. (The line opening is not specifically illustrated in FIG. 3, but may be inferred from the location of the line 24 departing from the case.) The ring handle 54 may be formed integrally with the case or housing 10, or may comprise a separate component pivotally attached or immovably affixed to the housing, as desired. Handgrip padding may also be provided on the ring handle 54, as shown in FIG. 3.

Figure 2:
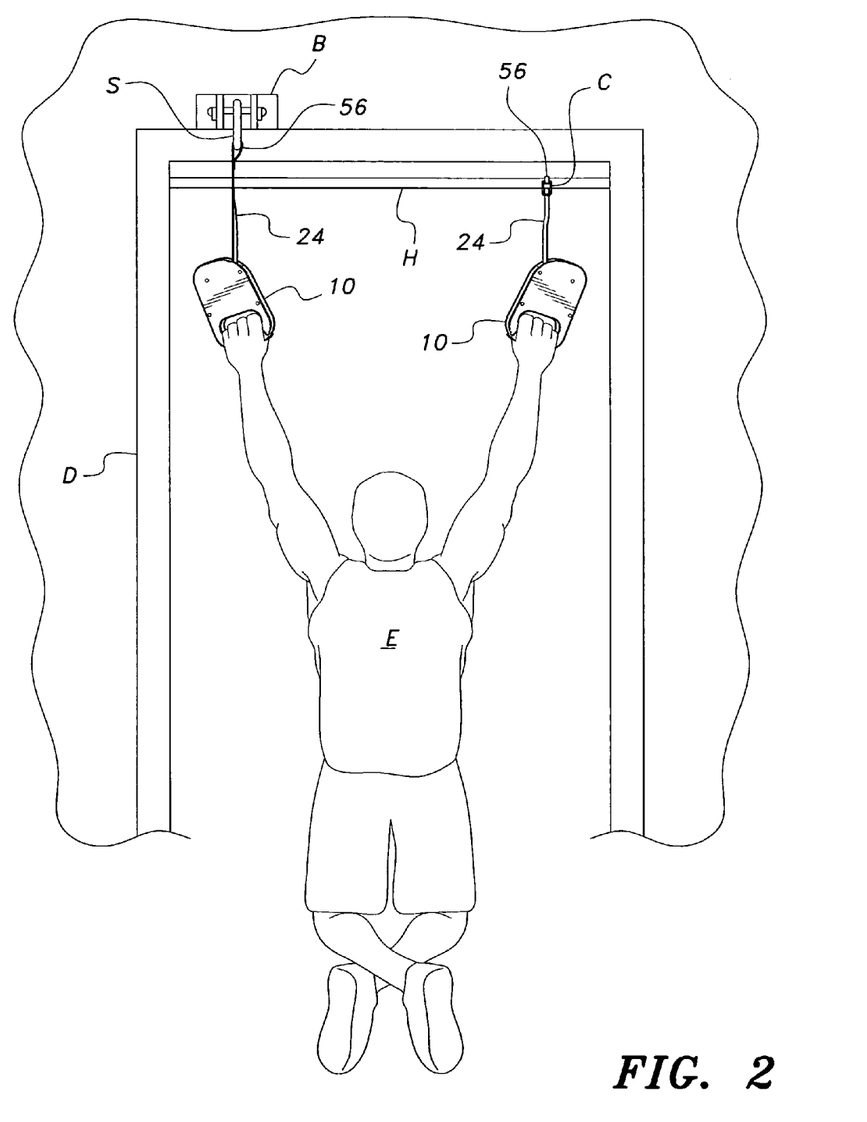
FIG. 2 is an environmental perspective view of a pair of the reel mechanisms of FIGS. 1A and 1B being used as an exercise system.

The reel mechanism 10 may be used to perform a wide variety of functions, e.g., as a pet leash or similar operation requiring a retractable line with means for quickly and easily locking the extension or retraction of the line. One environment for which the reel mechanism 10 is particularly well suited is in the field of exercise equipment. FIG. 2 provides an example of such. In FIG. 2, a pair of the reel mechanisms 10 is suspended across or above a doorway D by their webbing or lines 24, with the exercising person E suspended from the devices 10. Each of the lines 24 has a distal attachment end in the form of an anchor attachment loop 56 formed in the end of the webbing or line material.

Normally, it is anticipated that each of the devices will be supported or suspended by the same means. However, FIG. 2 illustrates two different means for suspending the reel mechanisms 10, as an example of their use. The left hand reel mechanism 10 is suspended from a shackle S, which is in turn suspended from a bracket B firmly anchored above the doorway D. The doorway also includes a hanger pole H affixed thereacross near the top thereof. The right hand reel mechanism 10 is shown suspended from the hanger pole H by passing the distal end of the line 24 around the pole, and installing a karabiner or other clip C through the loop and around the line 24 as it passes around the hanger pole H. Innumerable alternative means may be provided for anchoring the distal end loops 56 to a supporting structure, as desired.

The reel mechanism 10 is preferably used as an exercise device by installing two such devices 10 generally as shown in FIG. 2 of the drawings. The height of the attachments or anchor points is not particularly critical, as the exercising person E may retract the lines 24 as required to position the cases or housings and their handles at the desired height above the underlying floor or other surface, and/or may lift his or her feet from the floor as shown n FIG. 2. Two such mechanisms 10 may be used as a set of free rings for arm and upper body exercise, generally as shown in FIG. 2, particularly when the embodiment having the ring handle configuration 54 shown in FIG. 3 is used. As the webbing, strap, or line 24 may be adjusted to any desired extension from the case or housing of each device 10, they may be adjusted to hang evenly from different height attachment points as shown in FIG. 2. Alternatively, the lines 24 may be adjusted to position the two devices 10 at different heights, to serve as an uneven ring exercise apparatus. The locking or gripping mechanism of the devices 10, as shown in FIGS. 1A and 1B, grip the line 24 ever more tightly with increasing tension on the line due to the higher tension producing greater pivoting or lifting force on the toggle end 38 of the chock 34 and correspondingly greater gripping force with the line grip end 40 of the chock 34 against the doubled line 24 and ramp 28.

Two of the reel mechanisms 10 may even be used to raise oneself upwardly, if desired. This may be accomplished by supporting one's weight entirely from either device 10, e.g., the left side, by one hand and arm, and adjusting the orientation of the opposite device 10 (e.g., the right side) to adjust the departure path of the line extending therefrom to allow the retraction spring mechanism to retract some portion of the line 24. The procedure is then reversed, with the person's weight being suspended completely from the newly adjusted right hand device to remove his or her weight from the left hand side, and allowing the retraction mechanism to raise the left hand device upwardly. The procedure is repeated as desired to lift the person upwardly. Descents may be made safely by releasing the lock or grip of each device alternatively, and drawing the released device downwardly some distance as desired.

Figure 4:
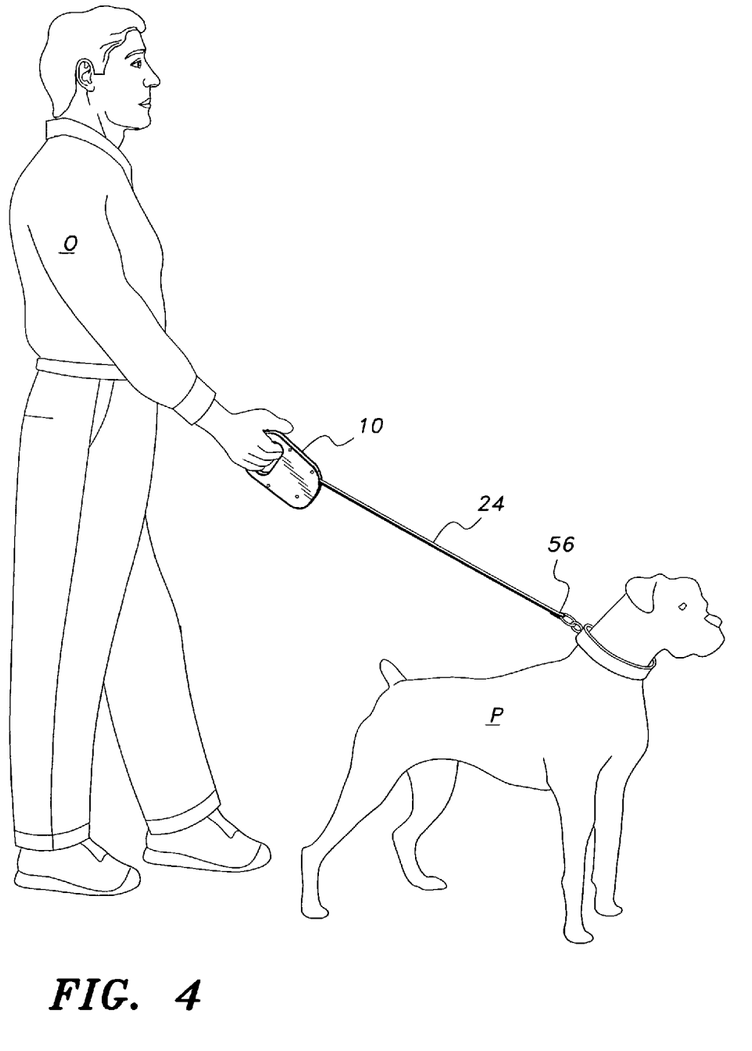
FIG. 4 is an environmental perspective view of a single reel mechanism according to the present invention being used as a leash.

The reel mechanism 10 in any of its embodiments is also well suited for use as a pet leash, as exemplified in FIG. 4 of the drawings. In FIG. 4, a pet owner O is shown walking his pet P using the reel mechanism 10 of the present invention. To restrain the pet P, the pet owner O need only hold the reel mechanism 10 generally in the orientation shown in FIG. 4, i.e., with the departure path of the line 24 extending generally radially relative to the central reel axle as shown in FIG. 1B of the drawings. This lifts or pulls the toggle end 38 of the chock 34 outwardly or upwardly, as shown in FIG. 1B, thereby frictionally locking the extension of the line 24 by gripping the line against itself and the ramp 28 as it doubles back over the ramp. The pet owner O may allow the pet P to travel farther from the owner O merely by lowering his arm to change the departure path of the line 24 to be generally tangent to the line contact surface 32 of the chock 34 and the guide pin 30, generally as shown in FIG. 1A. (It will be seen that inverting the orientation shown in FIG. 1A will provide the general orientation described above for releasing the lock or grip mechanism in the pet leash scenario described immediately above.) Retraction of the leash line 24 into the housing is accomplished by orienting the housing as described above and permitting sufficient slack to occur in the line to allow the internal retraction spring to retract the line onto the reel.

Figure 5A:
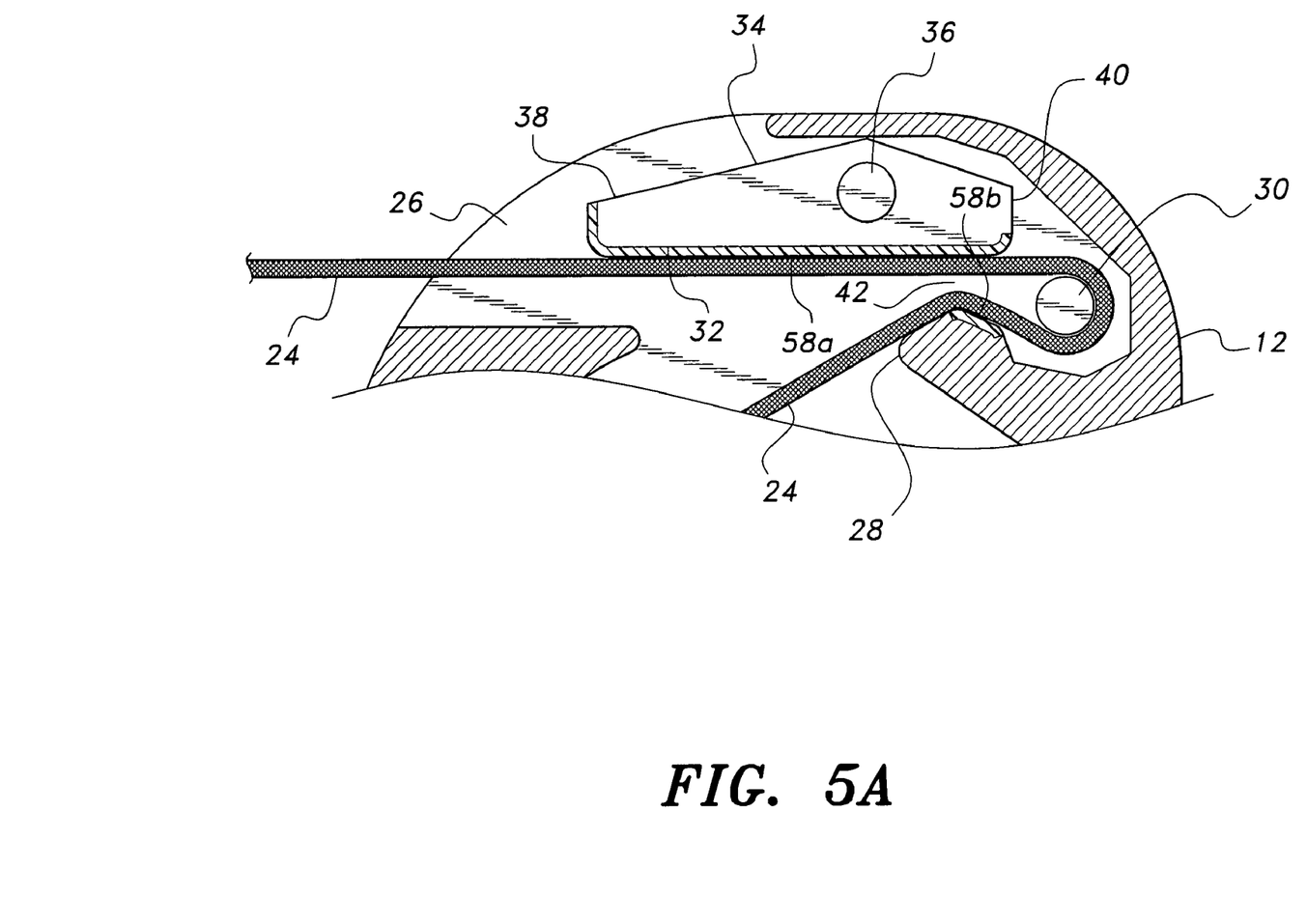
FIG. 5A is a broken away detailed front elevation view in section of the strap locking portion of a reel mechanism according to the present invention, with the grip faces of the mechanism having a high friction coefficient coating thereon.
Figure 5B:
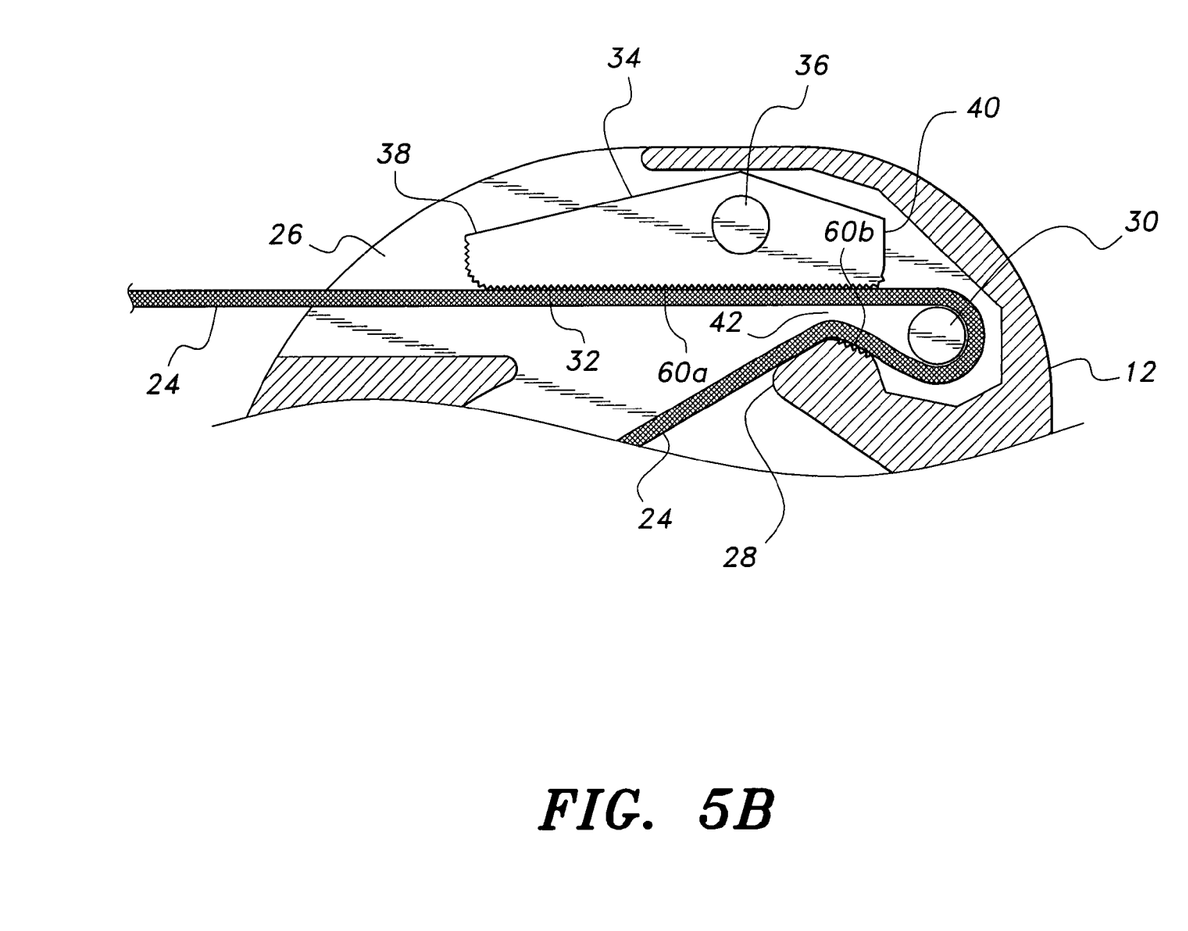
FIG. 5B is a broken away detailed front elevation view in section of the strap locking portion of a reel mechanism according to the present invention, with the grip faces of the mechanism having teeth disposed thereon.

It is anticipated that the line contact surface 32 of the chock 34 and the contact surface of the ramp 28 will provide sufficient frictional resistance to prevent extension of the line 24 when the departure path of the line is oriented as shown in FIG. 1B. However, it may be desirable to provide some additional high friction grip means on the contact surfaces of the chock and ramp, in some cases. FIGS. 5A and 5B illustrate such alternative grip means.

In FIG. 5A, the line contact surface 32 of the chock 34 is shown with a high friction gripping surface comprising a resilient coating 58a disposed thereon, with the corresponding ramp 28 being provided with a similar coating 58b. The resilient coatings 58a, 58b may comprise a hard rubber or other suitable material as desired. Alternatively, the line contact surface 32 of the chock 34 may have a high friction gripping surface comprising a roughened surface 60a of gripping teeth formed therein, with the corresponding ramp 28 having a similar roughened and/or toothed high friction gripping surface 60b, as shown in FIG. 5B of the drawings. In many applications and instances such roughened or toothed surfaces 60a, 60b may not be desirable due to potential wear and tear on the line 24 gripped therebetween, but such roughened gripping surfaces may be useful or desirable in other applications of the device 10 in its various embodiments.

In conclusion, the reel mechanism is suitable for use in a vast number of environments and applications. The facility with which the line gripping mechanism may be engaged and released, i.e., with a "twist of the wrist," enables the user to release or lock the line payout practically instantaneously. Yet, the extremely strong grip provided by the chock and ramp gripping mechanism on the doubled line passing therebetween provides sufficient grip for the device to support the weight of a person performing upper body strengthening exercises, or other uses and applications.

It is to be understood that the present invention is not limited to the embodiments described above, but encompasses any and all embodiments within the scope of the following claims.

We claim:

1. A reel mechanism, comprising:
   a housing defining a reel cavity, a reel axle generally centrally disposed within the reel cavity, and a line opening extending from the reel cavity;
   a reel disposed within the reel cavity, the reel being rotatably disposed upon the reel axle, the reel having a retraction spring cavity defined therein;
   a line retraction spring disposed within the retraction spring cavity of the reel, the spring extending between the reel and the reel axle;
   a ramp disposed within the housing;
   a guide pin disposed within the housing distal to the ramp;
   a chock pivotally disposed within the housing adjacent the line opening, the chock having a line contact surface, a toggle end, and a line grip end opposite the toggle end, the line grip end being disposed opposite the ramp and defining a line passage therebetween; and
   a flexible, extensible line coiled about the reel and extending across the ramp, around the guide pin, doubling back between the ramp and the grip end of the chock, and exiting the line opening, the line having a distal attachment end, the line defining a departure path from the housing, the line lifting the toggle end of the chock and pivoting the grip end of the chock toward the ramp and gripping the line between the toggle end of the chock and the ramp when the departure path is aligned generally radially with the reel axle, the chock releasing the line when the departure path is aligned generally tangentially with the line contact surface of the chock and the guide pin.

2. The reel mechanism according to claim 1, further comprising a handle extending from the housing opposite the line opening.

3. The reel mechanism according to claim 2, wherein the housing has opposed first and second sides and the handle has first and second ends substantially coplanar with the first and second sides of the housing, the reel mechanism further comprising a crossmember extending between the first and second ends, the housing, the first and second ends, and the crossmember defining an ovoid handgrip passage.

4. The reel mechanism according to claim 2, wherein the handle comprises a substantially circular ring.

5. The reel mechanism according to claim 2, further comprising handgrip padding disposed upon the handle.

6. The reel mechanism according to claim 1, wherein the line comprises a flat woven fabric web.

7. The reel mechanism according to claim 1, further comprising a high friction gripping surface disposed upon the ramp and the contact surface of the chock.

8. The reel mechanism according to claim 7, wherein each of the high friction gripping surfaces comprises a resilient coating.

9. The reel mechanism according to claim 7, wherein each of the high friction gripping surfaces comprises a roughened surface.

10. The reel mechanism according to claim 1, further comprising an anchor attachment formed in the distal attachment end of the line.

11. The reel mechanism according to claim 10, wherein the anchor attachment comprises a loop.

12. A reel mechanism, comprising first and second exercise units, each of the exercise units including;
- a housing defining a reel cavity, a reel axle centrally disposed within the reel cavity, and a line opening extending from the reel cavity;
- a reel disposed within the reel cavity and rotatably disposed upon the reel axle, the reel defining a retraction spring cavity;
- a line retraction spring disposed within the retraction spring cavity of the reel, the spring extending between the reel and the reel axle;
- a ramp disposed within the housing;
- a guide pin disposed within the housing distal to the ramp;
- a chock pivotally disposed within the housing adjacent the line opening, the chock having a line contact surface, a toggle end, and a line grip end opposite the toggle end, the line grip end being disposed opposite the ramp and defining a line passage therebetween;
- a flexible, extensible line coiled about the reel and extending across the ramp, around the guide pin, doubling back between the ramp and the grip end of the chock, and exiting the line opening, the line having a distal attachment end having an anchor attachment extending therefrom, the line defining a departure path from the housing, the line lifting the toggle end of the chock and pivoting the grip end of the chock toward the ramp and gripping the line between the toggle end of the chock and the ramp when the departure path is aligned generally radially from the reel axle, the chock releasing the line when the departure path is aligned generally tangentially with the line contact surface of the chock and the guide pin; and
- a handle extending from the housing opposite the line opening.

13. The reel mechanism according to claim 12, wherein the housing has opposed first and second sides and the handle has first and second ends substantially coplanar with the first and second sides of the housing, the reel mechanism further comprising a crossmember extending between the first and second ends, the housing, the first and second ends, and the crossmember defining an ovoid handgrip passage.

14. The reel mechanism according to claim 12, wherein the handle comprises a substantially circular ring.

15. The reel mechanism according to claim 12, further comprising handgrip padding disposed upon the handle.

16. The reel mechanism according to claim 12, wherein the line comprises a flat woven fabric web.

17. The reel mechanism according to claim 12, further comprising a high friction gripping surface disposed upon the ramp and the contact surface of the chock.

18. The reel mechanism according to claim 17, wherein each of the high friction gripping surfaces comprises a resilient coating.

19. The reel mechanism according to claim 17, wherein each of the high friction gripping surfaces comprises a roughened surface.

20. The reel mechanism according to claim 12, wherein the anchor attachment comprises a loop formed in the distal attachment end of the line.

* * * * *